US 6,681,706 B2

(12) United States Patent
Sauder et al.

(10) Patent No.: US 6,681,706 B2
(45) Date of Patent: Jan. 27, 2004

(54) APPARATUS AND METHOD FOR CONTROLLED DELIVERY OF SEEDS TO AN OPEN FURROW

(75) Inventors: Gregg A. Sauder, Tremont, IL (US); Kenneth R. Dill, Hopedale, IL (US); Don L. Dunlap, Pekin, IL (US)

(73) Assignee: Precision Planting, Inc., Tremont, IL (US)

(*) Notice: Subject to any disclaimer, the term of this patent is extended or adjusted under 35 U.S.C. 154(b) by 0 days.

(21) Appl. No.: 10/084,275

(22) Filed: Feb. 26, 2002

(65) Prior Publication Data

US 2003/0159631 A1 Aug. 28, 2003

(51) Int. Cl.$^7$ ................................................ A01C 7/18
(52) U.S. Cl. .................... 111/171; 111/177; 111/900
(58) Field of Search ..................... 111/163–169, 157, 111/171, 170, 177, 178, 77, 182, 900; 221/211

(56) References Cited

U.S. PATENT DOCUMENTS

| 3,077,290 A | * | 2/1963 | Rehder |
| 3,122,283 A | * | 2/1964 | Walters |
| 3,176,636 A | | 4/1965 | Wilcox et al. ................. 111/51 |
| 3,253,739 A | | 5/1966 | Martin |
| 3,413,941 A | * | 12/1968 | Roberson |
| 3,552,601 A | | 1/1971 | Hansen et al. .............. 221/219 |
| 3,913,503 A | * | 10/1975 | Becker |
| 3,971,446 A | * | 7/1976 | Nienberg .................... 172/311 |
| 4,009,668 A | | 3/1977 | Brass et al. .................... 111/85 |
| 4,023,509 A | | 5/1977 | Hanson ......................... 111/77 |
| 4,074,830 A | | 2/1978 | Adams et al. .............. 221/266 |
| 4,193,523 A | * | 3/1980 | Koning ...................... 111/77 X |
| 4,593,632 A | * | 6/1986 | Mikawa et al. |
| 4,613,056 A | | 9/1986 | Olson ........................... 221/211 |
| 4,646,941 A | * | 3/1987 | Grosse-Scharmann et al. ............................ 222/23 |
| 5,170,909 A | | 12/1992 | Lundie et al. .............. 221/211 |
| 5,501,366 A | | 3/1996 | Fiorido ........................ 221/211 |
| 5,542,364 A | * | 8/1996 | Romans ...................... 111/185 |
| 5,992,338 A | | 11/1999 | Romans ....................... 111/171 |
| 6,269,758 B1 | | 8/2001 | Sauder ........................ 111/177 |

FOREIGN PATENT DOCUMENTS

JP          5-30815       *  5/1993

OTHER PUBLICATIONS

S.I. Belt Meter™; S.I. Distributing, Date unknown.
7000 and 7100 MaxEmerge Planting Units and Attachments Parts Catalog; John Deere Seeding Group; pp. 46–47, Sep. 1999.

* cited by examiner

Primary Examiner—Christopher J. Novosad
(74) Attorney, Agent, or Firm—Larkin Hoffman Daly & Lindgren, Ltd.; Thomas J. Oppold (57) ABSTRACT

An apparatus and method for controlled delivery of seeds between the seed meter of an agricultural planter to an open seed furrow. Seeds are received individually and in a sequence from a seed meter into a housing. The seeds are conveyed in sequence through the housing by a conveyor at a controlled speed to a location proximate the open furrow, then gently released into the open furrow as the agricultural planter moves forward. The controlled delivery of the seed to the furrow ensures more accurate seed placement within the furrow at the desired seed spacing, thereby improving crop yield potential.

29 Claims, 6 Drawing Sheets

APPARATUS AND METHOD FOR CONTROLLED DELIVERY OF SEEDS TO AN OPEN FURROW

BACKGROUND OF THE INVENTION

1. Field of the Invention:

The present invention relates generally to agricultural seed planters, and more particularly to devices for delivering seed from the planter's seed meters to the open seed furrows.

2. Description of Related Art:

It is well recognized that uniformity in the spacing of seeds in a seed furrow is essential for maximizing a field's crop yield and thus enhancing the profitability of the farmer's operation. Modern agricultural planters use various types of seed metering devices designed to select and discharge individual seeds at regular intervals, to ideally achieve this uniformity in seed spacing.

The various types of seed metering devices currently being used on agricultural seed planters can generally be divided into two categories on the basis of the seed selection mechanism employed, namely, mechanical or pneumatic. The commercially available mechanical meters include finger-pickup meters such as disclosed in U.S. Pat. No. 3,552,601, cavity-disk meters such as disclosed in U.S. Pat. No. 4,613,056, and belt meters such as disclosed in U.S. Pat. No. 5,992,338. Commercially available pneumatic meters include vacuum-type meters such as disclosed in U.S. Pat. No. 5,501,366, and compressed air meters. Other commercially available meters combine the seed selection mechanisms of both mechanical and pneumatic meters such as disclosed in U.S. Pat. No. 4,074,830.

Regardless of whether they are of the finger-pickup type, vacuum-disk type, cavity-disk type or belt-type, the seed meters typically are mounted just below the seed hopper at heights ranging from about eighteen to about twenty-four inches above the ground surface. As a result, planters employing such metering devices also require seed tubes to direct the seeds into the open seed furrow after the singulated seeds are discharged from the seed meter.

It has been found that the use of seed tubes to deliver the seeds to the seed furrow have a negative effect on the uniformity of seed spacing in the furrow. This is due to the fact that some of the seeds descend through the seed tube rapidly, substantially in a free-fall through the entire length of the seed tube, while other seeds contact the walls of the seed tube more frequently as they descend through the seed tube, even to the point of ricocheting between opposite sides of the seed tube. These differences in the degree of contact with the seed tube lead to differences in the rates at which the seeds travel through the tube. In fact, it has been shown that on occasion a later-discharged seed from the seed meter will actually pass an earlier-discharged seed as both descend through the seed tube.

Several factors contribute to this problem. As an agricultural planter traverses a field, surface irregularities in the field lead to momentary jostling, vibration or other positional shifting of the planter components, including the seed tubes. Irregularities among the seeds themselves may be a factor as well. In any event, the uniformity at which seeds enter the seed tube after exiting the seed meter is typically not present as the seeds exit the seed tube. Further, although each seed tube performs the useful function of guiding its seeds toward the open furrow, the differences in velocities at which the seeds exit the seed tube toward the ground have an adverse effect on uniformity of seed spacing in the furrow.

Thus, there is a need in the agricultural industry for an apparatus and method for controlled delivery of the seed between the seed meter and the open furrow that improves seed placement accuracy within the open furrow at the desired seed spacing thereby improving crop yield and the efficiency and profitability of farming operations.

BRIEF SUMMARY OF THE INVENTION

A seed dispensing apparatus and method for controlled delivery of seeds from an agricultural planter's seed meter to an open furrow. The apparatus includes a conveyor support structure adapted for receiving individual seeds discharged by a seed metering device of an agricultural planter. The conveyor support structure includes a first end positioned near the seed metering device to receive seeds metered individually and in a sequence therefrom. A second end of the conveyor support structure is positioned proximate an open furrow in an agricultural field for movement along the furrow as the agricultural planter traverses the field. The apparatus further includes a seed conveyor mounted movably relative to the conveyor support structure. The seed conveyor is operable at a controlled conveyor speed to transport the seeds, in the sequence in which they are received from the seed meter, at the controlled conveyor speed from the first end toward the second end of the conveyor support structure. The conveyor further is operable to serially release the seeds proximate the second end of the conveyor support structure to dispense the seeds in sequence into the open furrow.

The conveyor support structure advantageously is provided as a housing, with an opening at the first end to receive the seeds from the seed meter, and an opening at the second end to dispense the seeds into the furrow. The housing, confines the seeds to more positively ensure their travel with the conveyor, and substantially at the controlled conveyor speed until they are dispensed.

In one preferred form, the seed conveyor includes an endless belt and a plurality of evenly spaced-apart flights extended outwardly from the belt. Each pair of adjacent flights cooperates with the belt to provide a seed compartment. At the first end, seeds are sequentially loaded into the compartments, one seed into each compartment. As the compartments travel from the first end to the second end for dispensing, walls of the housing cooperate with the belt and flights to retain each seed within its associated compartment until the compartment emerges from the housing at the second end, whereupon the seed is dispensed to the furrow.

Preferably the second end of the seed dispensing device is located near a top of the open furrow. If desired, the dispensing device incorporates a seed guide extending from the second end toward a bottom of the furrow, to further guide each seed as it descends toward the bottom of the furrow.

In an alternative approach, the seed conveyor includes two endless belts, juxtaposed to provide a conveyance path along which respective segments of the belts face one another in substantially uniform spaced-apart relation. The conveyance path extends from the first end to the second end, and along the conveyance path the opposing belt segments are driven in the same direction and at the same controlled conveyor speed. The distance between the opposed belt segments is less than the size (diameter or equivalent approximation) of the seeds. Consequently the seeds are maintained between the opposed belt segments by belt elasticity and friction as they are carried from the first end to the second end for dispensing.

The seed conveyor, whether a single flighted belt or a pair of confronting belts as just described, can be driven by a pulley operably coupled to the seed meter, with result that the controlled conveyor speed is governed by the seed meter speed. This arrangement advantageously assures that a uniform dispensing of seeds from the seed meter results in a uniform spacing of seeds along the seed conveyor. This arrangement also more positively ensures a one-to-one relationship of seeds and compartments, when the seed conveyor is provided as a single, flighted belt.

In an alternative arrangement, the drive pullies of the seed conveyor can be driven independently of the seed meter, such as by being operably coupled to an independently driven drive shaft or the lee. In this way, the spacing of the seeds could be momentarily increased or decreased depending on ground speed independent of the dispensing speed of the seed meter.

According to an alternative form of the invention, a seed meter and seed delivery apparatus are provided in combination. The seed delivery apparatus is adapted to receive individual seeds discharged from the seed meter, and to controllably convey the individually dispensed seeds to an open furrow. The seed delivery apparatus comprises a housing in comnmunication with the seed meter to receive the individually discharged seeds. The housing is adapted to be operably supported by a row unit frame of an agricultural planter, and has an open end terminating near the soil surface in substantial alignment with the open furrow. A seed conveying assembly is disposed in the housing, and adapted to individually convey the individually discharged seeds through the housing at a substantially constant predetermined velocity toward the open end of the housing for a depositing of the seeds into the open furrow.

Further in accordance with the present invention, there is provided an improved agricultural seed planter having a main frame operably supporting a plurality of adjacently spaced row units, each of the row units having a row unit frame supporting a seed hopper, a seed meter adapted to discharge individual seeds at regular intervals, and a seed delivery device adapted to receive the individual seeds discharged from the seed meter and to convey the individually discharged seeds at a controlled conveyor speed to a location near an open furrow for dispensing the seeds into the furrow.

Thus in accordance with the present invention, the seeds associated with a given row unit are received individually and in a sequence from their associated seed meter, conveyed at a controlled conveyor speed to a location proximate an open furrow, then released into the furrow in the same sequence, as the agricultural planter moves forward. This ensures a more even spacing between adjacent seeds, improving the crop yield and enhancing the efficiency of the farming operation.

To the accomplishment of the above objectives, features and advantages, this invention may be embodied in the forms illustrated in the accompanying drawings, attention being called to the fact, however, that the drawings are illustrative only, and that changes may be made in the specific form illustrated and described within the scope of the appended claims.

DETAILED DESCRIPTION OF THE INVENTION

Figure 1:
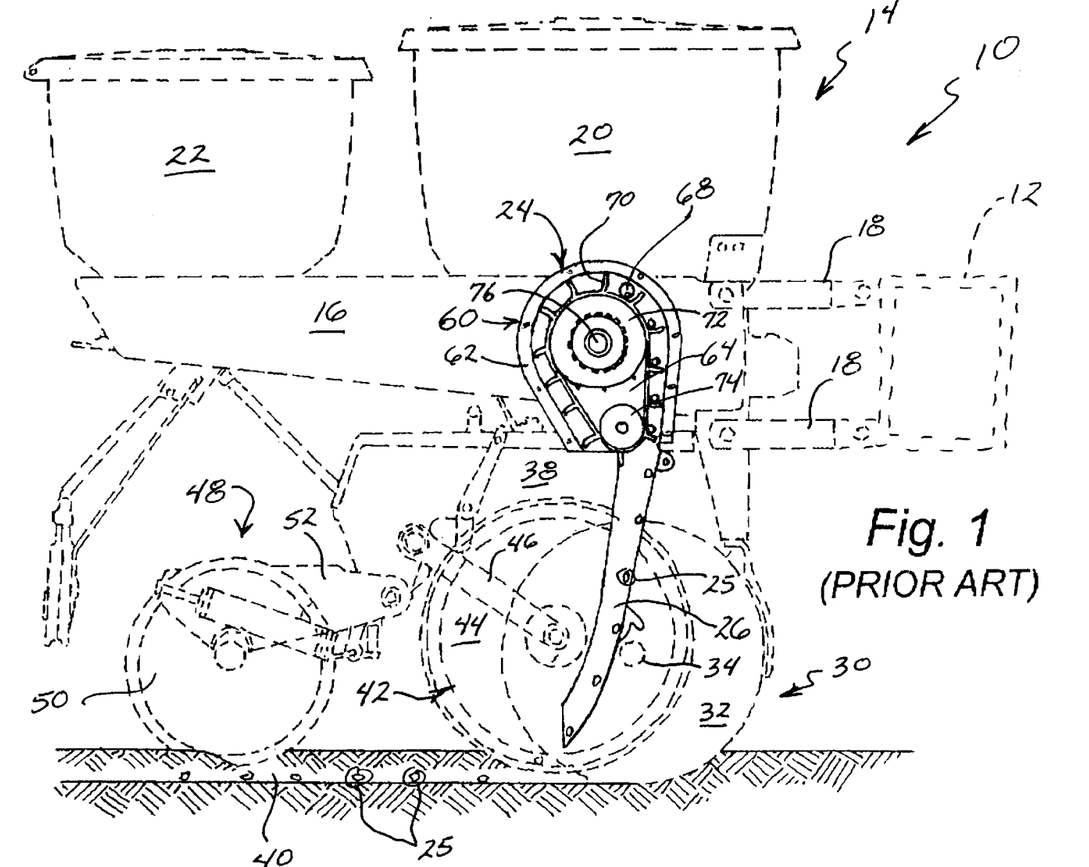
FIG. 1 is a side elevation view of a conventional agricultural planter showing the prior art seed tube for delivering the seeds discharged from a seed meter to the seed furrow.

Drawing FIG. 1 shows part of a typical agricultural planter 10, such as that disclosed in U.S. Pat. No. 4,009,668, which is incorporated herein by reference. As is conventional, the planter 10 includes a mobile main frame 12, only a portion of which is illustrated in FIG. 1. The main frame 12 is conventionally attached to and towed by a tractor (not shown) and a number of individual row units 14 are spaced at intervals along the main frame 12. Each row unit 14 includes a row unit frame 16, vertically adjustable relative to the main frame 12 by a parallel linkage 18. While only one row unit 14 is shown and described herein, the other row units on planter 10 are substantially the same. As is conventional, each row unit 14 includes a seed hopper 20 and a fertilizer hopper 22 mounted on the row unit frame 16. Each row unit 14 has a seed selection and dispensing device 24, commonly referred to as a seed meter, which receives seed from the seed hopper 20 and discharges the seeds 25 into a seed tube 26 at regular intervals. As shown in FIG. 1, and as explained in greater detail later, some planters, such as the John Deere 7000 and 7100 series planters with finger-pickup type seed meters, utilize a flighted seed belt assembly 60 disposed adjacent the seed meter to receive the seeds discharged by the seed meter 24. This flighted seed belt assembly 60 then conveys the seeds downwardly a short distance before dispensing the seeds into the seed tube 26.

A furrow opening assembly 30, disposed at the lead end of the row unit 14, typically comprises a pair of furrow opening disks 32 that rotate on shafts 34. The shafts 34 are supported by downwardly extending brackets from a row unit subframe 38. The axes of the respective furrow opening disks 32 are slightly inclined relative to one another so that the opening disks 32 contact one another forwardly and below the disk axes, preferably at ground level. In operation, the lower portions of the furrow opening disks 32 are disposed below the surface of the soil so that the disks from a V-shaped furrow 40 as the planter 10 traverses the field. The seed tube 26 deposits the seed in furrow 40 behind the axes of furrow opening disks 32. A gauge wheel assembly 42 is mounted on the row unit subframe frame 38 adjacent the furrow opening disks 32. The gauge wheel assembly 42 comprises a pair of gauge wheels 44 disposed adjacent the outer sides of the furrow opening disks 32. A gauge wheel arm 46 connects each gauge wheel 44 to the row unit subframe 38. An adjustable stop (not shown) operates between the row unit subframe 38 and the gauge wheel arm 46 to limit the upward movement of the gauge wheel 44 relative to the row unit subframe 38. Since the gauge wheels 44 ride on the ground surface when the planter 10 is moving, the vertical position of the gauge wheels 44 relative to the furrow opening disks 32 controls the depth of the furrow 40. A furrow closing assembly 48, typically comprising a pair of rotatable canted wheels 50 supported from an arm 52 is disposed rearwardly of the furrow opening assembly 30 and the seed tube 26, for closing the furrow 40 by pushing the soil back into the furrow over the deposited seeds. For greater detail, reference is made to said U.S. Pat. No. 4,009,668.

In regard to the furrow opening assembly 30, it should be appreciated that some conventional planters utilize a furrow opening assembly having only one furrow opening disk, while still other furrow opening assemblies utilize a shovel or the like. Thus, reference to the furrow opening assembly throughout this specification is intended to include any structure employed to create a furrow in the soil. Similarly, reference to the furrow closing assembly throughout this specification is intended to include any apparatus employed for replacing the soil over the deposited seeds in the furrow.

As identified above, some commercially available planters, such as the John Deere 7000 and 7100 series planters with finger-pickup type seed meters, utilize a flighted seed belt assembly. As shown in FIG. 1, the flighted seed belt assembly 60 is typically attached adjacent the finger-pickup meter 24 to receive individual seeds discharged therefrom and to dispense the individual seeds into the seed tube 26. For a more thorough discussion of the operation of a finger-pickup meter and its cooperation with the flighted seed belt assembly, reference may be made to U.S. Pat. No. 6,269,758 (Sauder) and to the parts catalog for the John Deere 7000 and 7100 MaxEmerge® Planting Units and Attachments, both of which are incorporated herein by reference. The seed belt asssembly 60 includes a substantially enclosed housing 62 comprised of side panels 64 spaced apart by a perimeter wall. In FIG. 1, one of the side panels 64 has been removed to show the internal components of the flighted seed belt assembly 60. A seed receiving opening 68 in the side panel 64 of the housing 62 is disposed adjacent the seed discharge opening of the seed meter 24 to receive seeds therefrom. A flighted belt 70 having a plurality of spaced apart, outwardly extending flights is trained around a studded drive pulley 72 and an idler pulley 74. The drive pulley 72 is rotatably driven by the drive shaft 76 of the finger-pickup meter 24. The adjacent pairs of flights of the belt 70 form compartments, each compartment designed to carry a single seed from the seed receiving opening 68 downwardly to the open lower end of the housing 62 as shown where the seed is released into the seed tube 26.

Figure 2:
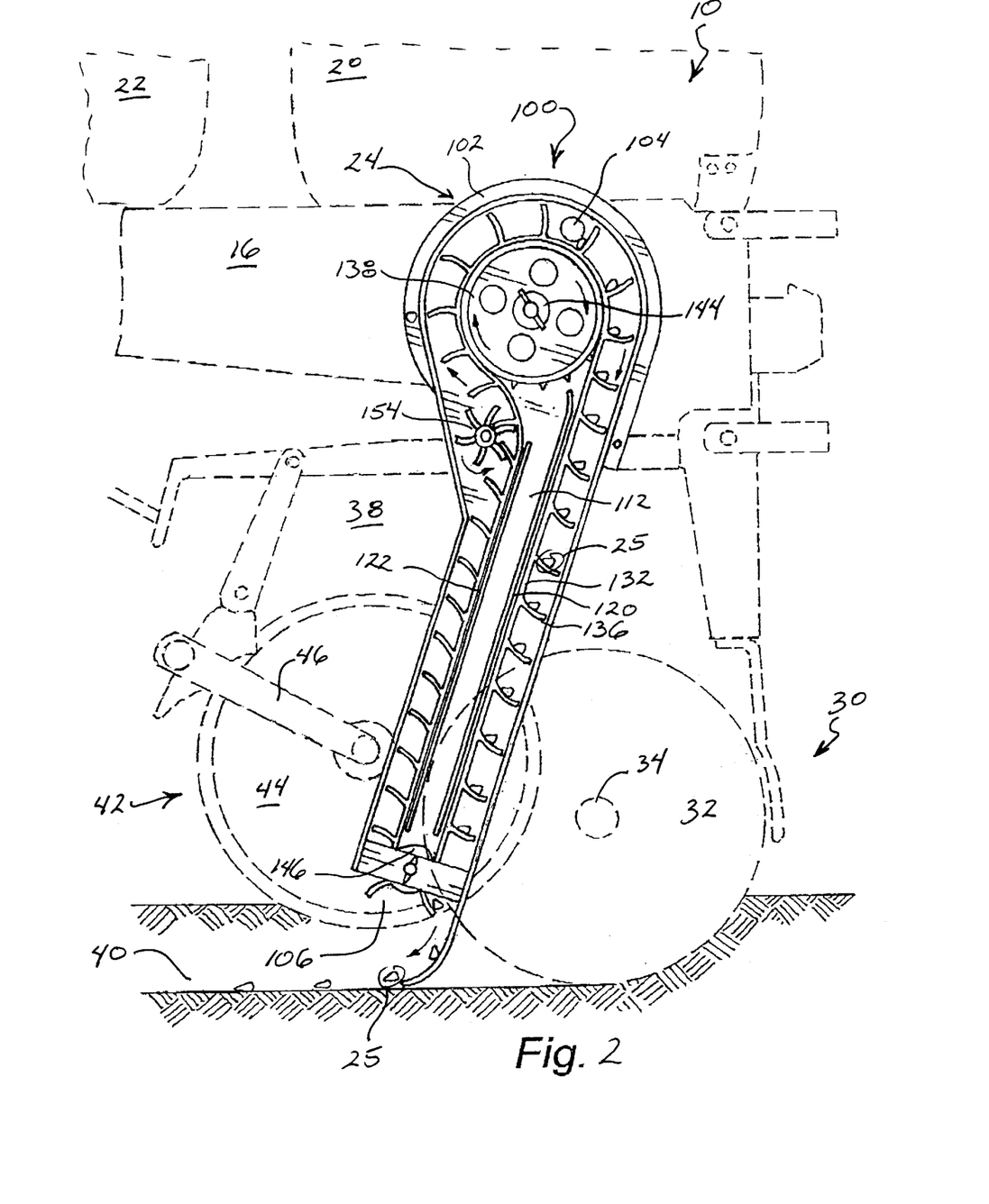
FIG. 2 is a side elevation view of the conventional agricultural planter of FIG. 1 with the prior art seed tube replaced by an embodiment of the seed delivery apparatus of the present invention shown receiving seeds from a seed meter.
Figure 3:
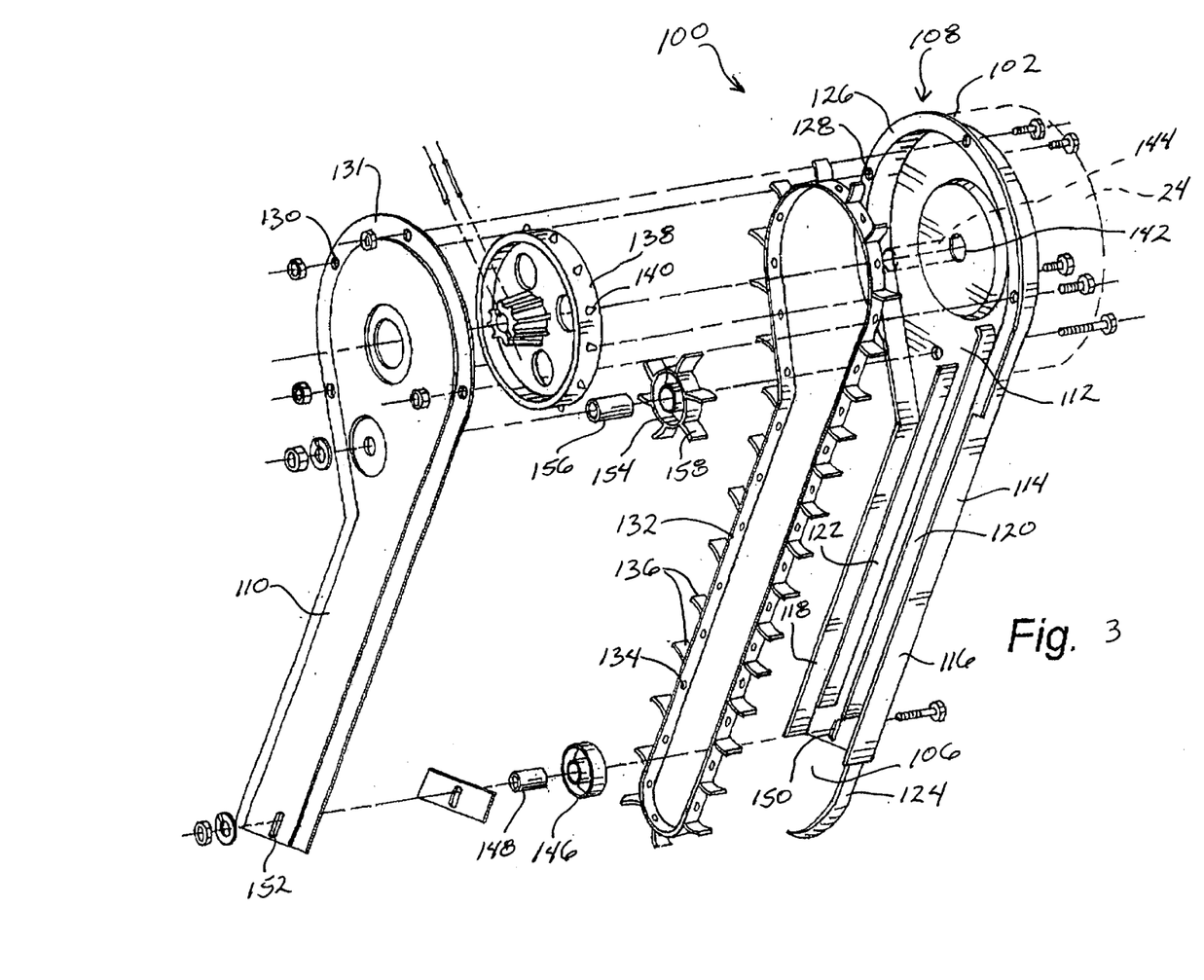
FIG. 3 is an exploded perspective view of the seed delivery apparatus of FIG. 2.

Referring now to drawing FIG. 2, the typical agricultural planter 10 of FIG. 1, is shown with the prior art seed tube 26 and seed belt housing 60 replaced by one embodiment of the seed delivery apparatus 100 of the present invention. As is apparent, the embodiment of the seed delivery apparatus 100 shown in FIGS. 2 and 3 is similar to the commercially available flighted seed belt housing 60 shown in FIG. 1, except that the flighted seed belt assembly has been elongated and modified for delivering seeds, individually in sequence and at a controlled conveyor speed, from the seed meter 24 all the way to the open furrow 40. Thus, the above identified problems and disadvantages associated with dispensing individual seeds into a seed tube are eliminated.

As viewed in FIG. 2, The seed delivery apparatus 100 is preferably operably supported by the planter's row unit frame 16. Generally, the seed delivery apparatus 100 comprises a conveyor support structure and a seed conveyor mounted movably relative to the conveyor support structure. In operation, the seed from the seed meter 24 enters the conveyor support structure at an upper end 102 through a seed receiving opening 104. The seed conveyor then conveys the seeds 25 downwardly toward a lower end 106, opened to allow dispensing of the seeds 25 into the furrow 40.

With reference to FIG. 3, it is seen that the preferred conveyor support structure includes a housing 108 that substantially encloses the seed conveyor. The housing 108 includes a substantially flat panel 110, and opposite panel 112 and a housing perimeter wall 114 perpendicular to the panels 110, 112. The housing perimeter wall 114 and the panel 112 preferably form a unitary member of the housing 108 as shown. The housing 108 incorporates a lower, elongate region along which opposite segments 116 and 118 of housing wall 114 are parallel to one another. Elongate belt guides 120 and 122 are disposed inside the housing 108 along the lower region, and run parallel to the opposed housing wall segments 116, 118. A seed guide 124 preferably extends downwardly from housing wall segment 116.

A flange 126 extends outwardly from the upper region of housing wall 114. Openings 128 through flange 126, and corresponding openings 130 through an outer circumferential portion 131 of panel 110, accommodate nut-and-bolt fasteners used to removably secure the panels 110, 112 and housing wall 114 together and thus form the substantially enclosed housing 108. The upper portion of the housing 108 is preferably enlarged to facilitate a coupling of the seed delivery apparatus 100 to the seed meter 24. The coupling is preferably releasable, such as by a bolted connection, enabling a retrofitting of the row unit 14 by attaching the seed delivery apparatus 100 in lieu of the prior art seed delivery structure incorporating the flighted seed belt assembly 60 and seed tube 26 described in connection with FIG. 1.

In the embodiment of FIGS. 2 and 3, the seed conveyor comprises an endless belt 132. A series of uniformly spaced apart apertures 134 are formed through the belt 132. A series of flights 136 extend outwardly from the belt 132, spaced apart from one another, by substantially the same distance. The seed delivery apparatus 100 further includes a plurality of pulleys to move and shape the endless belt 132, including a drive pulley 138. A plurality of studs 140 are preferably arranged circumferentially about the drive pulley 138, uniformly spaced apart from one another the same distance as apertures 134 of the endless belt 132. An opening 142 is provided through panel 112, for receiving a drive mechanism, such as a drive shaft 144, which also preferably drives the seed meter 24. In most conventional planters, the seed meter 24 is driven by a shaft that is coupled to a sprocket and chain assembly that may be either ground driven or driven independently of the ground speed of the planter. Thus, the drive shaft 144 for rotating the drive pulley 138 may simply be an extension of the same shaft used to drive the seed meter 24. The drive pulley 138 is operably removably coupled to the drive shaft 144 by any well known means, such as a key and pin arrangement, thereby providing rotational speed of the drive pulley 138 matched to the rotational speed of the seed meter 24.

At the lower end 106 of the seed delivery apparatus 100, the endless belt 132 is trained about an idler pulley 146, rotatable about a sleeve 148 and secured between panels 110 and 112 by removable fasteners extending through elongated apertures 150 and 152 through panels 110 and 112, to permit tension adjustment of the belt 132. A tabbed idler pulley 154 is mounted rotatable on a sleeve 156 between the panels 110, 112. The tabbed idler pulley 154 biases the endless belt 132 inwardly, providing a more secure wrapping engagement of the belt 132 around the drive pulley 138. The tabbed idler pulley 154 has a plurality of outwardly extending tabs 158, spaced apart from one another to positively interact with flighted belt 132.

The idler pulleys 146 and 154 cooperate to maintain the endless flighted belt 132 wrapped about drive pulley 138 in a driving engagement with the studs 140 of the pulley extending into the apertures 134 of the belt 132. As shown in FIG. 2, with the panel 112 removed, it is readily apparent that adjacent pairs of flights 136 cooperate with the endless belt 132 to form compartments, each compartment designed to carry a single seed from the seed receiving opening 104, downwardly to the open lower end 106 of the housing 108, where travel of each flight away from housing wall 114 releases the seed at a point near the top of the furrow 40. As the belt 132 continues to move, the forward flight 136 of each compartment supports its associated seed, so that the seeds descend at the controlled conveyor speed. The belt guides 120 and 122 act upon the belt near the housing wall segments 116 and 118 to stabilize the belt along these segments. These guides 120, 122 further prevent oscillations in the endless belt that might carry the belt inwardly away from the housing wall 114, thus tending to maintain the compartments substantially closed. In this manner, the belt guide 120 prevents each seed from slipping downwardly into the next adjacent compartment on its way to the point of release.

As perhaps best seen from FIG. 3, the flights 136 and the belt 132 have a width substantially equal to but less than the width of the housing wall 114. Accordingly, although the flighted belt 132 moves freely within the housing 108, the space between each panel 110, 112 and the flighted belt 132 is sufficiently narrow to prevent the escape of any seed from its compartment, until the intended point of release where movement of the belt 132 around the idler pulley 146 draws each flight 136 away from the housing wall 114. Each seed, during its descent beyond the point of release, preferably encounters the seed guide 124 and is thereby gently directed to the bottom of the furrow 40.

As previously noted, the same mechanism that operably drives the seed meter 24 also preferably rotates the drive pulley 138. Accordingly, the endless belt 132 is driven at a conveyor speed synchronized to the seed meter speed, to ensure that as the seed meter 24 discharges seeds individually and in a sequence, the seeds are received sequentially into each of the moving compartments.

It should be understood that although reference has been made herein to the type of planter disclosed in U.S. Pat. No. 4,009,668, and to a finger-pickup type seed meter, the flighted belt type embodiment of the seed delivery apparatus 100 of the present invention may be used with any type of planter having any type of mechanical or pneumatic seed metering device disposed a distance above the soil surface. The embodiment disclosed herein is readily adapted to any type of planter or seed meter with only minor modifications which would be readily appreciated by those skilled in the art. For example, the length of the housing 108 and belt 132, the positional relationship of the pulleys 138, 146, and the location of the opening 104 will depend on the type of planter and the type of seed meter. For example, FIG. 2 shows the opening 104 disposed in the side panel 112 of the seed delivery apparatus 100 such as, for example, if the housing 108 was disposed adjacent the backing plate of a finger-pickup type meter. However, if the meter 24 was a vacuum-disk type meter or a belt-type meter, for example, the opening 104 may need to be located such that the seeds from the meter drop into the upper end 102 of the housing 108 through the perimeter wall 114. Such minor modifications to the housing 108 with respect to the mounting of the housing to the planter frame 16 and positional relationship of the opening 104, which are dependent upon the type of planter and seed meter utilized, would be readily appreciated by those skilled in the art, and therefore further discussion of such minor modifications to the embodiment disclosed herein is not warranted.

Figure 4:
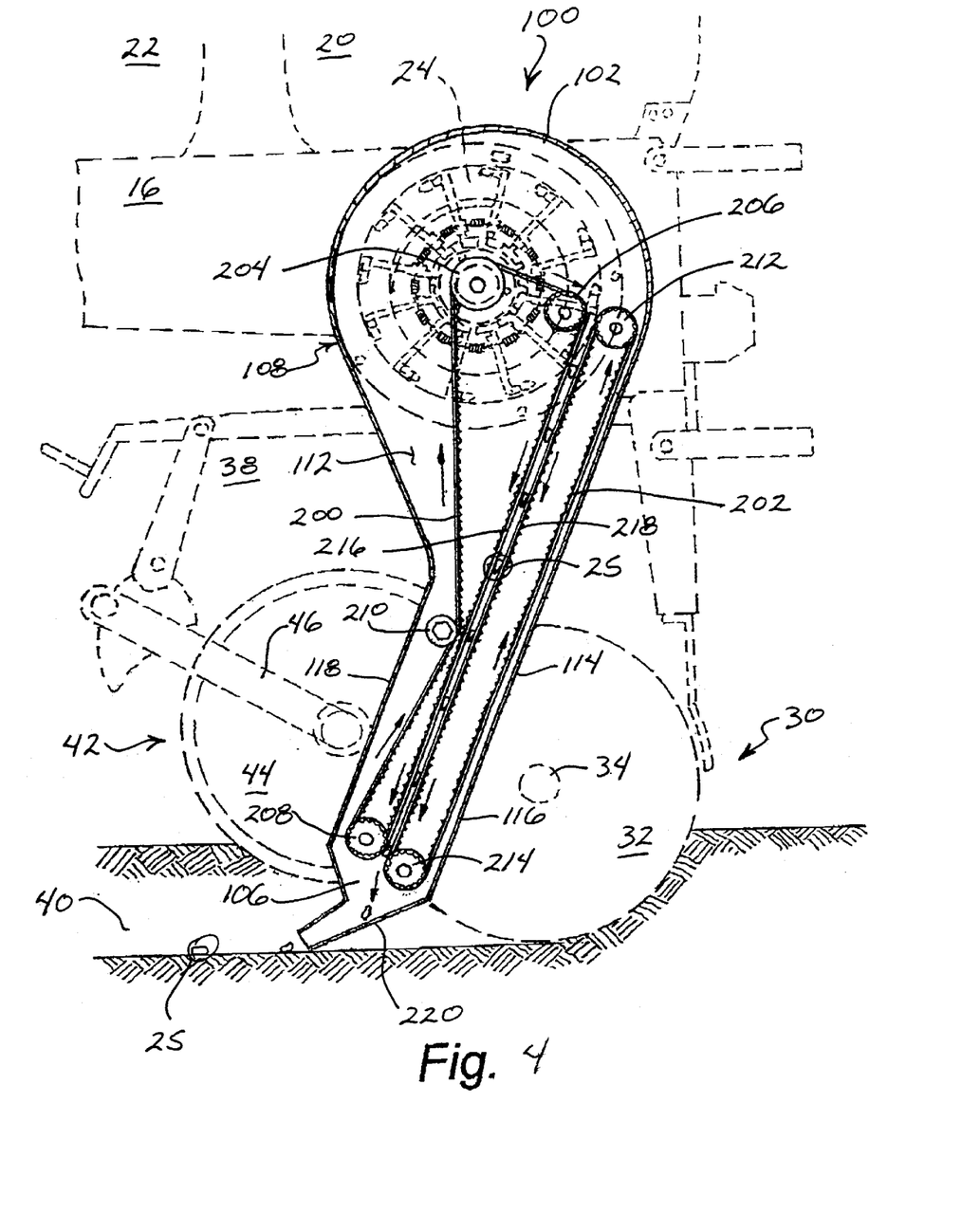
FIG. 4 is a side elevation view of the conventional agricultural planter of FIG. 1 with the prior art seed tube replaced by another embodiment of the seed delivery apparatus of the present invention shown receiving seeds, for example, from a conventional finger-pickup type seed meter.
Figure 5:
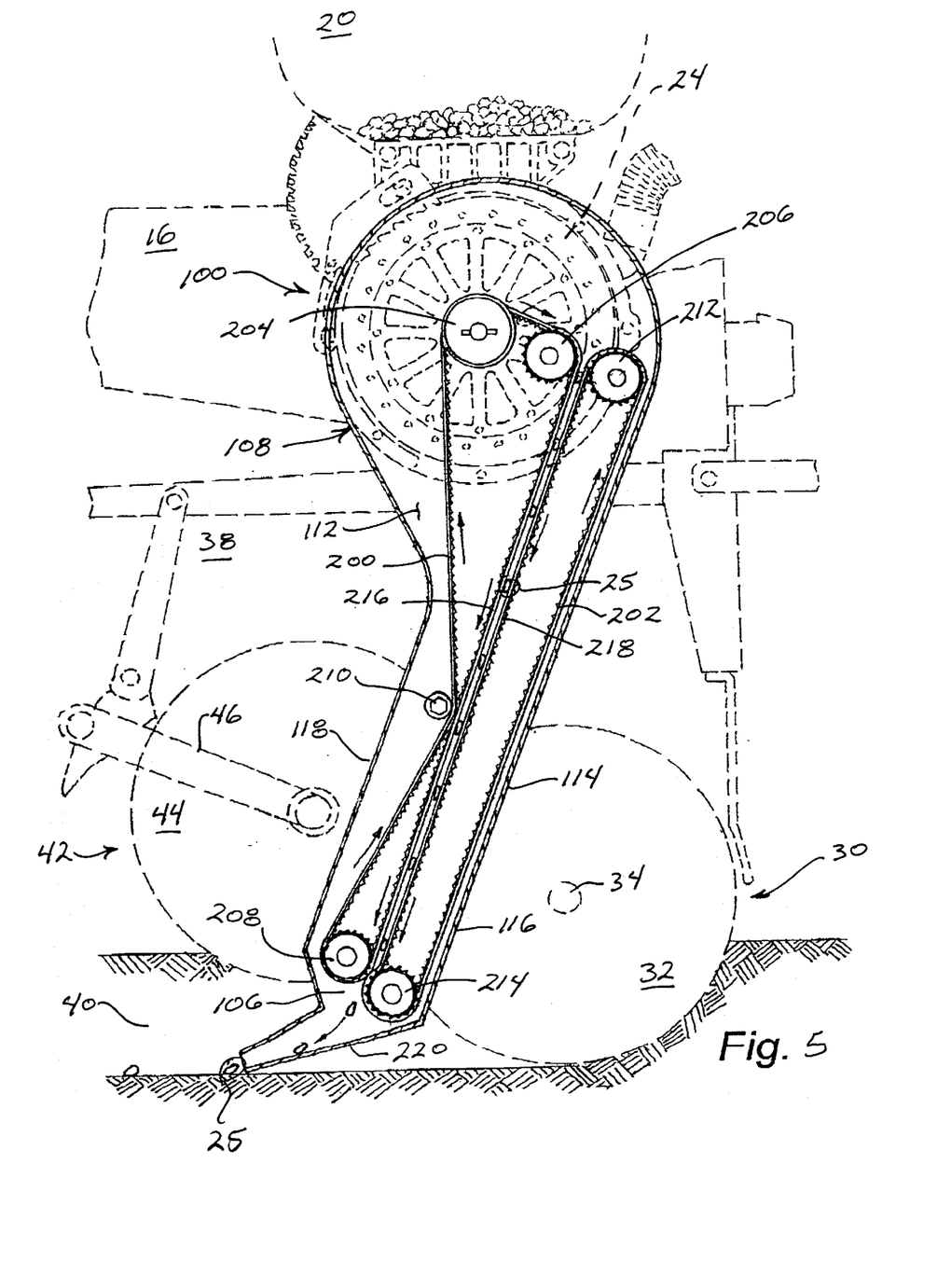
FIG. 5 is a side elevation view of the conventional agricultural planter of FIG. 1 with the prior art seed tube replaced by another embodiment of the seed delivery apparatus of the present invention shown receiving seeds, for example, from a conventional vacuum-type seed meter.
Figure 6:
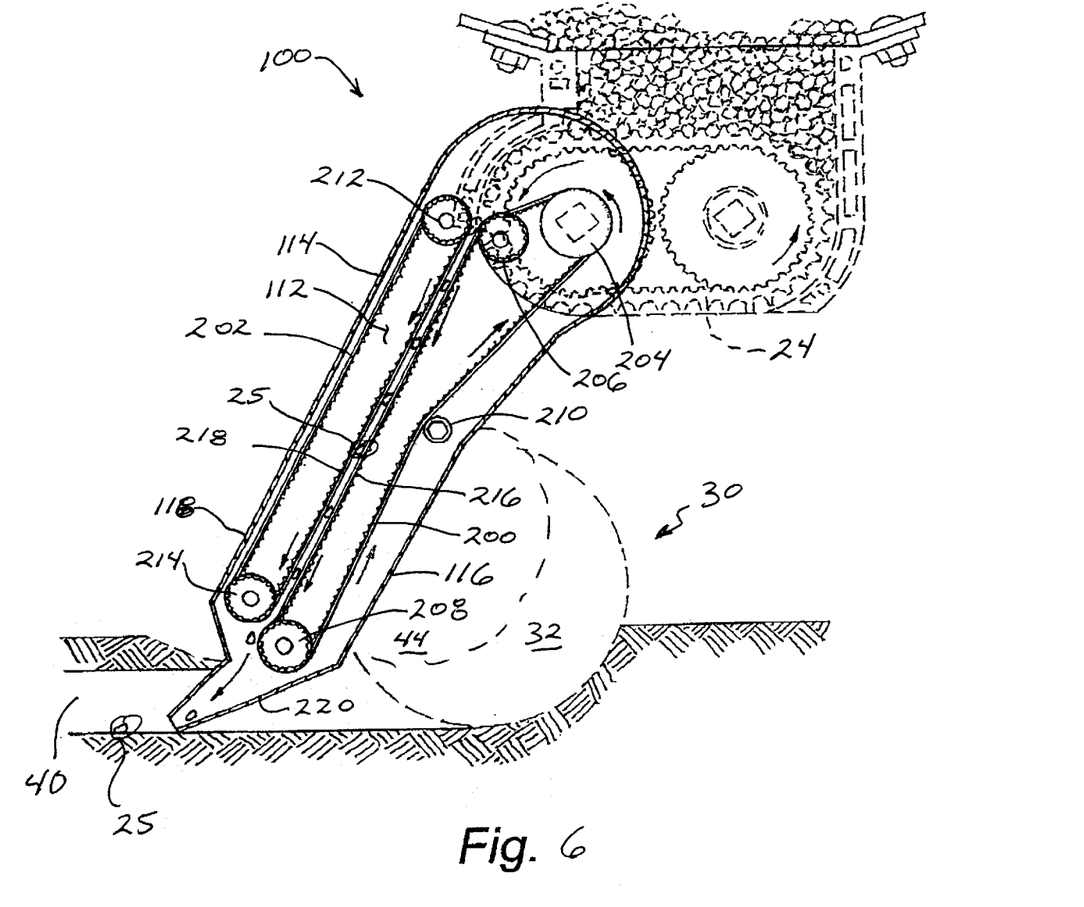
FIG. 6 is a side elevation view of the conventional agricultural planter of FIG. 1 with the prior art seed tube replaced by another embodiment of the seed delivery apparatus of the present invention shown receiving seeds, for example, from a conventional belt-type seed meter.

Drawing FIGS. 4–6 illustrate other alternative embodiments of the seed delivery apparatus 100 for receiving seeds from a seed meter 24 and delivering the seeds in a controlled manner to the seed furrow. Rather than utilizing a conveyor comprising a single flighted belt as shown if FIGS. 2 and 3, the embodiments shown in FIGS. 4–6 utilize a conveyor comprising two adjacently disposed belts 200, 202.

The embodiment of the seed delivery apparatus 100 of FIG. 4 is shown operably supported with respect to the row unit frame 16 adjacent a finger-type seed meter 24, for example, as described in U.S. Pat. No. 3,552,601 (Hansen) which is incorporated herein by reference. As with the previously described embodiment, the seed delivery apparatus 100 includes a housing 108 including a housing wall 114 and opposed panels 110, 112. In FIG. 4, panel 110 has been removed for clarity. The conveyor includes a first endless belt 200 trained about a drive pulley 204, an idler pulley 206 near the top of the seed delivery apparatus 100, and an idler pulley 208 near the bottom of the apparatus 100. An adjustable tensioning pulley 210 biases the belt 200 inwardly. A second endless belt 200 is trained about a drive pulley 212 and an idler pulley 214, which can be mounted adjustably in a slot (not shown) for belt tensioning if desired.

Endless belts 200 and 202 are juxtaposed to provide confronting linear belt segments 216 and 218, both of which travel downwardly is indicated by the arrows. Preferably, the drive pulleys 204 and 212 are synchronized such that belts 200 and 202 travel at the same controlled conveyor speed. Then, as each seed is discharged by the seed meter 24, the discharged seed is captured between the endless belts 200, 202 at a conveyor entry point between pulleys 206 and 212 and conveyed downwardly toward the lower idler pulleys 208 and 214. Confronting belt segments 216 and 218 are spaced apart from one another by a transverse distance less than the size (diameter or other suitable measurement) of the seeds, and are sufficiently flexible to undergo a slight elastic deformation due to each of the seeds positioned between the belts. Due to the localized deformation, the belts exert an elastic restoring force that acts, along with friction, to fix the seeds relative to the belts during downward travel toward pulleys 208 and 214. The amount of the elastic restoring force for a given local displacement due to each seed can be adjusted by adjusting the belt tension, such as providing elongated mounting holes (not shown) in the face panels 110, 112. In addition, the amount of elastic deformation required can be varied by adjusting the transverse displacement between segments 216 and 218 of the belts 200, 202. This later adjustment also enables this conveyor to accommodate a variety of different sizes of seeds while providing substantially the same amount of elastic deformation between the belts for varying seed sizes.

In any event, belts segments 200 and 202 cooperate to provide a conveyance path, along which the seeds are moved, individually, in sequence, and at the controlled conveyor speed. As each seed is carried past pulleys 208 and 214, the opposing segments 216, 218 of the belts 202 and 204 diverge about the pulleys, releasing the seed to a gradually inclined guide section 220 of the housing 108, from which the seed is dispensed into the furrow 40.

Drawing FIG. 5 schematically illustrates a further alternative embodiment of the seed delivery apparatus 100 adapted to receive seeds from a vacuum-type seed meter 24, for example, as described in U.S. Pat. No. 5,501,366 (Fiorio) which is incorporated herein by reference.

Drawing FIG. 6 schematically illustrates a further alternative embodiment of the seed delivery apparatus 100 adapted to receive seeds from a belt-type seed meter 24, for example, as described in U.S. Pat. No. 5,992,338 (Romans) which is also incorporated herein by reference. As is readily apparent between drawing FIGS. 4–6, the seed delivery apparatus 100 of the present invention is substantially the same, but, depending on the type of seed meter to which the seed delivery apparatus 100 is adapted, the profile of the housing 108 as well as the size and location of the drive pulleys 204, 212, idler pulleys 206, 208 and 214, and tensioning pulley 210 may need slight modification. Those skilled in the art would readily appreciate how to incorporate these minor variations between the embodiments of the seed delivery apparatus 100 for use with the various types of seed meters 24, and therefore further discussion of these various embodiments is not warranted.

As shown, in FIGS. 2–6, the conveyor of the seed delivery apparatus 100 is driveably coupled to the seed meter 24, and therefore synchronized with the seed meter 24. As an alternative, any of the conveyors of the different embodiments of the present invention can be operably coupled to an independent drive mechanism such that the speed of the conveyor is independent the speed of rotation of the seed meter 24. An independent drive mechanism is particularly adapted to the two-belt conveyor embodiments of FIGS. 4–6 since the belts do not include flights that are preferably timed with the seed dispensing rate of the seed meter as in the embodiment of FIGS. 2 and 3.

By driving the conveyor independently of the seed meter 24 the spacing of the seeds in the furrow could be controlled independent of the discharge rate of the seed meter. For example, the drive pulley(s) 204 and/or 212 could be operably coupled to the planter's ground wheels or possibly to an independently driven motor. If the drive pulley(s) 204 and/or 212 were coupled to the ground wheels of the planter, such as by a well known sprocket and chain assembly, the spacing of the seeds could be increased or decreased while on-the-go simply by increasing or decreasing the ground speed of the planter. For example, with reference to FIGS. 4–6, the distance shown between adjacent seeds along the conveyance path is uniform, determined by the rate of discharge from the seed meter and the speed of endless belts 200, 202. By coupling the drive pulleys 204, 212 to the ground speed of the planter, instead of to the seed meter, the seed meter dispensing rate may remain constant while the conveyor speed may be reduced considerably, such as by one-half, for example. Thus, the spacing between adjacent seeds likewise would be reduced by one-half because the seed handling rate of the meter, in terms of number of seeds per unit time discharged by the meter would remain the same while the belt speed is reduced by one-half. The adjacent seeds would remain at one half their original spacing until the planter resumed a faster ground speed, at which time the seed spacing would increase accordingly.

Regardless of whether the seed dispensing apparatus 100 employs one or two endless belts, the apparatus 100 transports the seeds at controlled speeds for substantially the entire distance from the seed meter to the open furrow. The seeds are maintained in the order in which they are discharged from the meter, and a uniform spacing between adjacent seeds is maintained, despite any jostling or vibrating of row unit components due to surface irregularities along the agricultural field traversed by the planter, and despite any differences in the seeds themselves. The conveyor may be coupled synchronously with its associated seed meter, or driven independently to provide a conveyor speed independent of the speed of the associated seed meter.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An improved agricultural seed planter, said planter having a main frame operably supporting a plurality of adjacently spaced row units, each said row units having a row unit frame operably supporting a seed hopper, a furrow opening assembly comprising at least one furrow opening disk adapted to open a seed furrow in a soil surface, a furrow closing assembly adapted to close the seed furrow in the soil surface, and a seed meter disposed a distance above the soil surface and adapted to discharge individual seeds at regular intervals, the improvement comprising:
    a seed delivery apparatus having:
        a housing in communication with the seed meter to sequentially receive the individually discharged seeds therefrom, and operably supported by the row unit frame, said housing having an open end disposed in substantial alignment with the open furrow, and further wherein at least a portion of said housing is disposed transversely adjacent said at least one furrow opening disk of the furrow opening assembly; and
        seed conveying means disposed in said housing for controllably conveying the individually discharged seeds in sequence from the seed meter to proximate the soil surface until serially releasing the seeds through said open end in said housing and into the open furrow.

2. The improved agricultural seed planter of claim 1 wherein said seed conveying means includes a continuous belt disposed around a drive pulley and an idler pulley, said continuous belt having a predetermined plurality of flights that individually receive the individual discharged seeds from the seed meter and retain the individual seeds in sequence until being serially released through said open end in said housing and into the open furrow.

3. The improved agricultural seed planter of claim 2 wherein said drive pulley is operably coupled to the seed meter and is operably rotatably driven thereby in synchronous relation.

4. The improved agricultural seed planter of claim 1, wherein said seed conveying means includes a first continuous belt having a length disposed in spaced opposition to a length of a second continuous belt, said first continuous belt disposed around a first drive pulley and a first idler pulley, said second continuous belt disposed around a second drive pulley and a second idler pulley, said first drive pulley operably coupled to said second drive pulley such that said opposing lengths of said first and second continuous belts travel at substantially the same speed, said first and second continuous belts disposed within said housing to receive the individual seeds discharged by the seed meter and retain the individual seeds in sequence between their opposing lengths before being serially released through said open end in said housing and deposited into the open furrow.

5. The improved agricultural seed planter of claim 4 wherein at least one of said first and second drive pulleys is operably coupled to the seed meter and is operably rotatably driven thereby.

6. The improved agricultural seed planter of claim 4 wherein at least one of said first and second drive pulleys is operably coupled to a drive mechanism and is operably rotatably driven thereby independent the seed meter.

7. The improved agricultural seed planter of claim 4 wherein said length of at least one of said first and second continuous belts is movably adjustable relative to said opposing length of said other continuous belt to accommodate various sizes of the individually discharged seeds.

8. In combination, a seed meter and a seed delivery apparatus for an agricultural seed planter having a furrow opening assembly comprising at least one furrow opening disk adapted to open a seed furrow in a soil surface, the seed meter adapted to discharge individual seeds at regular intervals, said seed delivery apparatus comprising:
   a housing in communication with the seed meter to serially receive the individually discharged seeds therefrom, said housing having an open end disposed in substantial alignment with the open furrow in the soil surface, and further wherein at least a portion of said housing is disposed transversely adjacent said at least one furrow opening disk of the furrow opening assembly; and
   seed conveying means disposed in said housing for controllably conveying the individually discharged seeds in sequence from the seed meter to proximate the soil surface until serially releasing the seeds through said open end in said housing and into the open furrow.

9. The combination of claim 8 wherein said seed conveying means includes a continuous belt disposed around a drive pulley and an idler pulley, said continuous belt having a predetermined plurality of flights that individually receive the individual discharged seeds from the seed meter and individually retain the individual seeds until being released through said open end in said housing and dispensed into said open furrow.

10. The combination of claim 9 wherein said drive pulley is operably coupled to the seed meter and is operably rotatably driven thereby in synchronous relation.

11. The combination of claim 8, wherein said seed conveying means includes a first continuous belt having a length disposed in spaced opposition to a length of a second continuous belt, said first continuous belt disposed around a first drive pulley and a first idler pulley, said second continuous belt disposed around a second drive pulley and a second idler pulley, said first drive pulley operably coupled to said second drive pulley such that said opposing lengths of said first and second continuous belts travel at substantially the same speed, said first and second continuous belts disposed within said housing to receive the individual seeds discharged by the seed meter and retain the individual seeds in sequence between their opposing lengths before being serially released through said open end in said housing and deposited into the open furrow.

12. The combination of claim 11 wherein at least one of said first and second drive pulleys is operably coupled to the seed meter and is operably rotatably driven thereby.

13. The combination of claim 11 wherein at least one of said first and second drive pulleys is operably coupled to a drive mechanism and is operably rotatably driven thereby independent the seed meter.

14. The combination of claim 11 wherein said length of at least one of said first and second continuous belts is movably adjustable relative to said opposing length of said other continuous belt to accommodate various sizes of the individual discharged seeds.

15. A method of improving accuracy in placement of individual seeds in an open seed furrow in a soil surface, said method comprising:
   providing a furrow opening assembly having at least one furrow opening disk;
   providing a seed metering device disposed a distance above the soil surface which discharges individual seeds therefrom at regular intervals;
   providing a housing in communication with said seed meter to receive the individually discharged seeds in sequence therefrom, said housing having an open end proximate the soil surface in substantial alignment with the open seed furrow, and further wherein at least a portion of said housing is disposed transversely adjacent said at least one furrow opening disk of said furrow opening assembly;
   providing seed conveying means within said housing for controllably conveying the individually discharged seeds from the seed meter until proximate the soil surface; and
   serially releasing the individual conveyed seeds through said open end in said housing proximate the soil surface and into the open seed furrow.

16. The method of claim 15 wherein said step of providing the conveying means for controllably conveying the individually discharged seeds includes providing a continuous belt disposed around a drive pulley and an idler pulley, said continuous belt having a predetermined plurality of flights that individually receive the individual seeds and individually retain the individual seeds in sequence through said housing before being serially released through said open end in said housing and deposited into the open seed furrow.

17. The method of claim 16 wherein said drive pulley is operably coupled to the seed meter and is operably rotatably driven thereby in synchronous relation.

18. The method of claim 15 wherein said step of providing the conveying means for controllably conveying the individually discharged seeds through said housing includes providing a first continuous belt having a length disposed in spaced opposition to a length of a second continuous belt, said first continuous belt disposed around a first drive pulley and a first idler pulley, said second continuous belt disposed around a second drive pulley and a second idler pulley, said first drive pulley operably coupled to said second drive pulley such that said opposing lengths of said first and second continuous belts travel at substantially the same speed, said first and second continuous belts disposed within said housing to receive the individual seeds discharged by the seed meter and retain the individual seeds in sequence between their opposing lengths before being serially released through said open end in said housing and deposited into the open seed furrow.

19. The method of claim 18 wherein at least one of said first and second drive pulleys is operably coupled to the seed meter and is operably rotatably driven thereby.

20. The method of claim 18 wherein at least one of said first and second drive pulleys is operably coupled to a drive mechanism and is operably rotatably driven thereby independent the seed meter.

21. The method of claim 18 wherein said length of at least one of said first and second continuous belts is movably adjustable relative to said opposing length of said other continuous belt to accommodate various sizes of the individually discharged seeds.

22. A seed delivery device for an agricultural row crop seed planter, comprising:

a conveyor support structure having a first end positioned near a seed metering device to receive seeds metered individually and in a sequence therefrom, said conveyor support structure further having a second end positioned proximate an open seed furrow and in substantial alignment therewith, and further wherein at least a portion of said conveyor support structure is disposed transversely adjacent a furrow opening disk; and a seed conveyor disposed within and moveable relative to said conveyor support structure to transport the seeds in sequence and at a controlled conveyor speed from said first end toward said second end until the seeds are serially released proximate said second end and into said open seed furrow as the agricultural planter traverses the field.

23. The device of claim 22 wherein said controlled conveyor speed is constant.

24. The device of claim 22 wherein said controlled conveyor speed is variable in proportion to a linear speed of the agricultural planter carrying said conveyor support structure.

25. The device of claim 22 wherein said controlled conveyor speed is variable in proportion to a metering speed of said metering device.

26. The device of claim 22 wherein said conveyor support structure comprises a housing substantially enclosing said seed conveyor, said housing including a seed receiving opening near said first end, and a seed dispensing opening near said second end.

27. The device of claim 26 wherein said seed conveyor comprises an endless belt and a plurality of flights extended outwardly from said belt and substantially uniformly spaced apart from one another.

28. The device of claim 22 further including a seed guide near said second end of said conveyor support structure, disposed to encounter the seeds dispensed proximate said second end.

29. The device of claim 22 wherein said seed conveyor comprises first and second endless belts including respective first and second belt segments extending between said first and second ends, confronting one another, and spaced apart from one another by a distance less than a diameter of the seeds whereby said endless belts, when moved in concert at said controlled conveyor speed, are adapted to transport the seeds toward said second end at said controlled conveyor speed.

* * * * *